March 3, 1964
E. A. BERG
3,122,951
TIRE REPAIR PLUG INSERTING APPARATUS
Filed Feb. 6, 1962
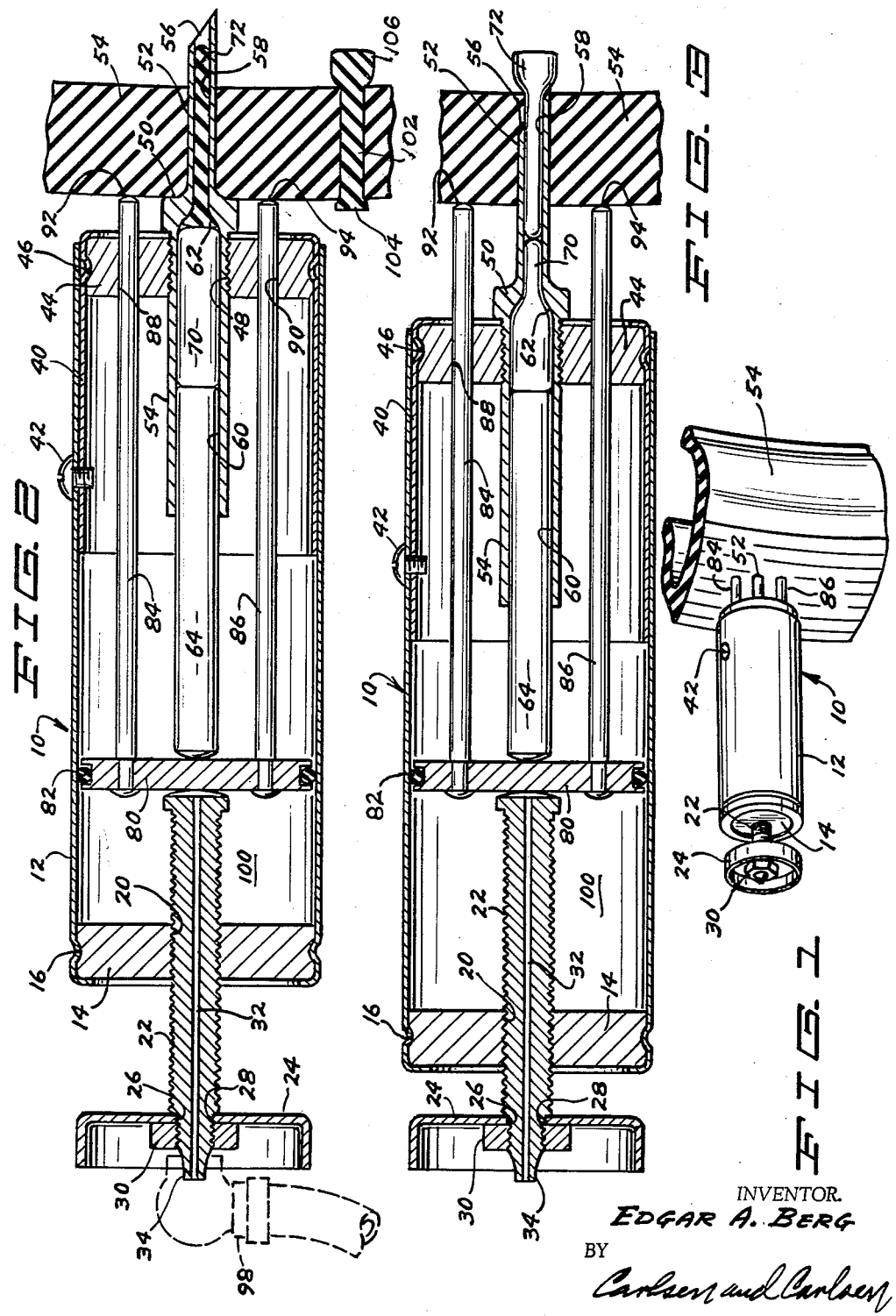
INVENTOR.
EDGAR A. BERG
BY
Carlsen and Carlsen
ATTORNEYS United States Patent Office 3,122,951
Patented Mar. 3, 1964

3,122,951
TIRE REPAIR PLUG INSERTING APPARATUS
Edgar A. Berg, P.O. Box 895, Grand Forks, N. Dak.
Filed Feb. 6, 1962, Ser. No. 171,379
3 Claims. (Cl. 81—15.7)

The present invention relates to tire repair equipment and more particularly to equipment for inserting a resilient tire repair plug into a puncture in the casing of a tire. The invention has particular utility in the repair of tubeless tires.

A number of devices have been previously proposed for injecting a resilient tire repair plug into a puncture in the casing of a tire. Some of the devices previously proposed for the repair of tubeless tires are relatively costly and complicated in operation. Other prior devices of the type described provide a means for extruding a rubber plug through a needle and into the casing of a tire but have no provision for retracting the needle. As a result, subsequent manual retraction of the needle is likely to withdraw the plug or if the needle has been inserted a little too far into the casing, the plug can be extruded entirely through the casing wall and into the interior of the tire.

Other prior devices, while providing a means for retracting the needle through which the repair plug is placed in the tire, they require, on the other hand, that a new needle be used each time a tire is repaired. The needle that has been emptied must be discarded each time a tire is repaired. This needle is, of cousre, an item of significant cost.

Another deficiency of the tire repair plug injecting devices now in use is that they must be operated manually. In most cases, the device is operated by means of a screw which the operator turns to advance a plunger, the plunger in turn acting to extrude the tire repair plug. Manual movement of a plunger and in particular the turning of a screw to advance a plunger is, of course, a relatively slow and time consuming operation.

Another important deficiency of many of the prior tire repair plug insertion devices is that a tire repair plug of a special and often complicated shape is required. Such repair plugs must be molded in special dies and the plugs themselves are therefore relatively costly.

In view of the deficiencies of the prior art, it is a general object of the present invention to provide an improved tire repair device of the type which will enable a tire to be repaired from the outside of the casing and without removing the tire from the rim.

It is another general object of the present invention to provide an imporved tire repair plug insertion apparatus which is rugged in construction, reliable in operation and can be manufactured at a relatively low cost.

It is another object of the present invention to provide an improved tire repair plug insertion apparatus adapted for the insertion of repair plugs having a very simple external shape and which can be made without special molding dies but wherein the plugs can nevertheless be easily and reliably inserted into a tire casing and will reliably remain in place when the tire is placed in use.

It is yet another object of the present invention to provide an improved tire repair plug injection apparatus with a reuseable injection needle, a means for retracting the needle from the tire casing simultaneously with the extrusion of a repair plug through the needle and means for permitting the tire repair plug to be easily and quickly placed within the needle when the apparatus is to be used.

It is still another object of the present invention to provide an improved tire repair apparatus for inserting a plug into a tire casing which can be operated either manually or through the use of air pressure.

These and other more detailed and specific objects will be disclosed in the course of the following specification, reference being had to the accompanying drawings, in which—

FIG. 1 is a perspective view of a tire repair apparatus according to the present invention as it appears during use with the injection needle in a partially retracted position.

FIG. 2 is a central longitudinal sectional view of the apparatus of FIG. 1 with the injection needle inserted into the casing of a tire as it appears before the tire repair plug has been injected.

FIG. 3 is a view similar to FIG. 2 showing the apparatus as it appears when the repair plug is partially extruded into the tire casing and the injection needle is partially retracted.

Briefly stated, the present invention comprises a frame with a repair plug injection needle removably mounted at one end thereof, a plunger slidably mounted within the needle and a means operatively associated with the plunger for driving the plunger into the needle. The needle is provided with a relatively small bore at its outward end and a larger bore at its inward end. The large bore is made of sufficient size to easily accommodate a tire repair plug in its normal expanded condition. A tapered throat communicates between the small and large bores.

One means for moving the plunger relative to the frame comprises a screw threaded into one end of the frame and operatively associated with the plunger.

According to a preferred form of the invention, the frame comprises a tubular casing which is sealed at one end. A piston is slidably mounted in the casing and operatively associated with the plunger. An inlet opening is provided in the casing between the sealed end thereof and the piston thereby enabling the plunger to be driven into the needle by air admitted into the casing through the inlet opening.

A retraction means such as a pair of retraction rods are associated with the piston to move with the piston as the piston is moved toward the needle thereby retracting the needle from the tire casing as the plug is extruded from the needle.

The invention will be best understood by reference to the accompanying figures which illustrate a preferred form of my invention by way of example.

Referring now to the figures, there is shown a tire repair plug insertion apparatus 10 including a frame in the form of a hollow tubular casing 12. The casing 12 is sealed at one end by means of a generally cylindrical member 14. The member 14 is rigidly secured within the casing 12 by the provision of a circumferentially extending groove 16 in member 14 into which a portion of the wall of the casing 12 is pressed.

The member 14 is threaded centrally at 20 to receive an elongate operating screw 22. A hand wheel 24 is supported at the end of screw 22 and is held against rotation with respect to the screw by the provision of a central opening 26 having an irregular cross sectional shape fitted onto a portion 28 of the screw with a corresponding cross sectional configuration. The hand wheel 24 is secured in place by means of a nut 30.

The screw 22 is preferably provided with a longitudinally extending bore 32 for purposes hereinafter explained and the outward end thereof is provided with a nipple 34.

Telescopically mounted within the opposite end of the casing 12 from the member 14 is a tubular end fitting 40. The fitting 40 can be secured to the casing 12 by means of a screw 42. A closure member 44 is rigidly secured within the outward end of the fitting 40 by the provision of a circumferentially extending recess 46 into which portion of the wall the fitting 40 is pressed. The center of the member 44 is bored and provided with screw threads 48 into which is threaded a repair plug insertion needle 50.

The needle 50 includes two parts, an outwardly projecting nozzle portion 52 of a reduced outside diameter and a receiver portion 54 of a greater diameter. The nozzle portion is adapted to be inserted into a puncture in the casing of the tire such as the tire 54 and to facilitate insertion, the needle 52 can be cut obliquely at its outer end 56. The needle 50 is provided with a first bore 58 of a reduced diameter within the portion 52 and a second coaxial bore 60 of a greater diameter within the receiver portion 54. The bores 58 and 60 communicate with each other through a tapered throat 62.

Slidably mounted within the receiver 54 is a plunger 64 used for pressing a tire repair plug out of the needle 50 and into the tire casing 54. The bore 60 of the receiver 54 is large enough to readily receive a resilient cylindrical tire repair plug 70 while in its normal relaxed shape. A second resilient repair plug 72, similar in all respects to plug 70, is positioned within the bore 58 of the nozzle portion 52 immediately before the device is used. The plugs 70 and 72 can be lubricated with glycerine or other suitable lubricant before being placed in the needle 50. Between the inward ends of the plunger 64 and operating screw 22 is a piston 80 which is slidably mounted within the casing 12. An air tight seal is provided between the piston 80 and the wall of the casing by means of a circumferentially extending sealing member such as a rubber O-ring 82.

Rigidly secured to the piston 80 and extending axially therefrom are a pair of retraction rods 84 and 86. The rods 84 and 86 are slidably mounted within openings 88 and 90 respectively in the member 44. The outermost ends 92 and 94 of the retraction rods are adapted to abut against the outside surface of the tire casing 54 and during operation move with the plunger 64 and operating screw 22 relative to the casing 12 toward the right in the figure to the position of FIG. 3 thereby driving the casing 12 and the needle 50 to the left in the figures relative to the casing 54. In this way, the nozzle portion 52 is withdrawn from the puncture as the plug 72 is ejected therefrom.

As the piston 80 drives the retraction rods 84 and 86 to the right in the figures, relative to the casing, piston 64 is also driven to the right relative to the casing, the tire repair plug 70 is moved from its position shown in FIG. 2 to the position previously taken by the tire repair plug 72 of FIG. 2. The repair plug 72, however, is forced entirely out of the needle 52 and into the tire casing 54.

While manual operation of the apparatus through rotation of the hand wheel 24 is preferred for some purposes, the apparatus can be operated much more rapidly and efficiently by air pressure. To operate the apparatus by air pressure, a compressed air outlet nozzle such as nozzle 98, illustrated in dotted lines in FIG. 2, is placed over the nipple 34 and compressed air is allowed to pass through the bore 32 of the screw 22 and into a chamber 100 within the casing 12 and between the member 14 and the piston 80. As the air from the nozzle 98 passes into the chamber 100, the piston 80 will be forced to the right in the figures relative to the casing 12 without any movement of the screw 22 relative to the casing. Retraction rods 84 and 86 will move with the piston to the right as viewed in the figures thereby withdrawing the needle 52 from the casing 54 of the tire. The piston 80 will also move the plunger 64 into the receiver 54 to drive the repair plugs 70 and 72 to the right within the needle as viewed in the figures.

In FIG. 2, a repair plug is shown at 102 at it appears after being inserted into the tire casing 54. The center portion of the plug is stretched to some extent and is reduced in diameter. The enlarged end portions 104 and 106 securely retain the plug within the tire.

It will be understood by inspection of the drawings and from the above description that the repair plugs 70 will be positioned within the nozzle portion 52 after the plunger 64 has been driven fully to the right as seen in the figures. To prepare the apparatus for reuse, the operator merely removes the needle 50 from the threaded opening 48 and inserts a fresh tire repair plug into receiver 54 to the position of plug 70. When the apparatus is then used, the movement of the plunger 64 into the needle 50 will force the fresh plug into the nozzle portion 52 and the plug that was in the nozzle 52 immediately before use will be injected into the casing of the tire.

By operating the apparatus according to my invention with air pressure, as described hereinabove, the time required for a tire to be repaired can be drastically shortened. I have found that after the needle has been inserted into the tire casing and the nozzle 98 positioned over the nipple 34, the plug 72 can be injected into the tire casing 54 in as little as one or two seconds thereby substantially reducing the time required for tire repair operation to be completed.

It will be understood from the above description, the needle 50 can be used over and over again and need not be discarded each time the apparatus is used. Moreover, the apparatus is readily adapted for use with tire repair plugs having a relatively simple cross sectional shape. The plugs 70 can, for example, be made from rubber rod stock of a suitable composition, the latter being commercially available at a relatively low cost.

A number of devices embodying the present invention have been built and used under service conditions and were found to be rugged in construction and reliable in operation.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A tire repair plug injection apparatus comprising in combination a hollow cylindrical casing of a first diameter, said casing being sealed at one end thereof, a piston slidably mounted within said casing, means for sealing said piston in air-tight relationship with the inside wall of said casing, a tire repair plug injection needle of a second diameter smaller than said first diameter secured to one end of said casing, a plunger operatively associated with said needle to drive a repair plug from within said needle into the casing of the tire, said plunger also being associated with said piston to move toward said needle as said piston is moved toward said needle, said casing having an inlet opening therein between said piston and the sealed end thereof, a nipple communicating with said opening for the introduction of compressed air into said casing, the passage of air into said casing through said inlet being adapted to drive said piston and said plunger toward said needle to thereby force a repair plug out of said needle and to the casing of said tire, at least one retraction member being rigidly connected to said piston and slidably mounted within said apparatus casing laterally of said needle, said retraction member including a portion extending outwardly of said one end of said casing and being adapted to rest against the outward surface of the tire to thereby force said needle away from said tire casing as said piston and said plunger move toward said needle.

2. A tire repair plug injection apparatus comprising in combination, an air cylinder, said air cylinder having a piston slidably mounted therein, an injection needle having a diameter smaller than said cylinder, said needle being mounted at one end of said cylinder, a plunger operatively associated with said piston and said injection needle to extrude a tire repair plug from said needle when said piston moves within said cylinder toward said injection needle, said air cylinder having an inlet opening therein through which compressed air can be introduced into said cylinder to drive said piston toward said injection needle, connecting means communicating with said inlet opening for introducing air into said opening, said cylinder having slidably mounted therein a retraction member positioned laterally of said needle, a portion of said retraction member extending outwardly through one end of said cylinder, said retraction member being operatively associated with said piston to move with said piston as said piston moves toward said injection needle, whereby said injection needle is retracted from said tire when said piston is moved toward said injection needle.

3. A tire repair plug injection apparatus comprising in combination, an air cylinder, said air cylinder having a piston slidably mounted therein, an injection needle having a diameter smaller than said cylinder, said needle being mounted at one end of said cylinder, a plunger operatively associated with said piston and said injection needle to extrude a tire repair plug from said needle when said piston moves within said cylinder toward said injection needle, said air cylinder having an inlet opening therein through which compressed air can be introduced into said cylinder to drive said piston toward said injection needle, connecting means communicating with said inlet opening for introducing air into said opening, said injection needle comprising an outwardly extending nozzle portion and a receiver communicating with said nozzle portion, said nozzle portion having a longitudinally extending first bore therein, said receiver portion having a second bore therein and a diameter larger than the diameter of said first bore and coaxial therewith, said first and second bores communicating with each other through a tapered throat, said plunger being slidably mounted within said second bore.

References Cited in the file of this patent
UNITED STATES PATENTS

| | | |
|---|---|---|
| 495,454 | Cummings et al. | Apr. 11, 1893 |
| 864,226 | Blodgett | Aug. 27, 1907 |
| 1,269,922 | Gadecki | June 18, 1918 |
| 1,348,005 | Hirst | July 27, 1920 |
| 1,676,425 | Chapman | July 10, 1928 |
| 2,828,657 | Fromberg | Apr. 1, 1958 |
| 2,928,300 | Rodgers | Mar. 15, 1960 |
| 2,956,460 | Nowotny | Oct. 18, 1960 |